United States Patent [19]
Lardillat et al.

[11] Patent Number: 5,975,146
[45] Date of Patent: Nov. 2, 1999

[54] VENTILATION DUCT AND INSULATION PANEL USED FOR ITS INTERNAL LINING

[75] Inventors: Alain Lardillat, Courbevoie; Alain Melinand, Chalon sur Saone, both of France; Claes Staffan Tigerfeldt, Hesingborg, Sweden

[73] Assignee: Isover Saint-Gobain, Courbevoie, France

[21] Appl. No.: 08/743,158

[22] Filed: Nov. 4, 1996

[30] Foreign Application Priority Data

Nov. 3, 1995 [FR] France ................................... 95 12986
Dec. 14, 1995 [SE] Sweden ................................... 9504476

[51] Int. Cl.⁶ ..................................................... F16L 9/22
[52] U.S. Cl. ........................... 138/149; 138/155; 138/167
[58] Field of Search ..................... 138/149, 120, 138/155, 152, 167

[56] References Cited

U.S. PATENT DOCUMENTS

| | | | |
|---|---|---|---|
| 1,063,672 | 6/1913 | Flannery | 138/155 |
| 3,317,074 | 5/1967 | Barker, Jr. et al. | 138/149 |
| 3,835,606 | 9/1974 | Liberman | 138/149 |
| 4,241,762 | 12/1980 | Link et al. | 138/120 |
| 4,280,536 | 7/1981 | Gnant | 138/149 |
| 4,462,618 | 7/1984 | Stone | 138/149 |
| 5,379,806 | 1/1995 | Matthews et al. | 138/149 |
| 5,391,840 | 2/1995 | Hughes et al. | 138/149 |
| 5,441,083 | 8/1995 | Korsgaard | 138/149 |
| 5,749,399 | 5/1998 | Reyes Zorrilla | 138/120 |
| 5,783,268 | 7/1998 | Noonan et al. | 138/149 |

*Primary Examiner*—James F. Hook
*Attorney, Agent, or Firm*—Oblon, Spivak, McClelland, Maier & Neustadt, P.C.

[57] ABSTRACT

A ventilation duct includes an envelope lined on the inside by insulation panels. The panels have a lining on the side of the flow channel of the duct and on at least one part of at least one of transverse edges of the duct. This lining extends over at least one part of each of both sides of the edge and is integrated with the panel. Z shaped sections may be used to hold adjacent panels.

8 Claims, 8 Drawing Sheets

VENTILATION DUCT AND INSULATION PANEL USED FOR ITS INTERNAL LINING

BACKGROUND OF THE INVENTION

1. Field of the Invention

This invention pertains to a ventilation duct that includes a casing which is internally lined with at least one insulation panel, and also pertains to the panel in question.

2. Description of the Related Art

Insulation panels which are traditionally used to line the interior of ventilation ducts generally come in the form of a felt material or mat of mineral wool (glass wool or rock wool) possibly covered with a sheet of mineral material (for example, a fabric or voile of glass) or a sheet of aluminum on its "internal" side (the side which will be on the side of the air passage in the duct) and/or on the side opposite the latter. This sheet allows one, for example, to avoid erosion of the felt material made of mineral wool and/or to impart to it certain thermal, mechanical and/or acoustical properties.

In the known ventilation ducts, the insulation panel(s) is installed by gluing or nailing to the interior of the duct, these installations being sometimes time consuming and not very practical (especially installation by gluing). The insulation panels can also be assembled by using shaped sections which hold these panels in a stable position inside the duct. Such assemblies of panels and shaped sections are described in the patent DE 1 679 519. The panels are installed side-by-side in the duct in such a way as to ensure good insulation and to define the circulation channel of the duct. Known ducts, however, frequently experience problems of wear and/or insulation (problems of air tightness, condensation, particularly when these ducts are used in air conditioning installations—creation of thermal bridges and so forth) at places of contact of the panels with one another, particularly at the junction of consecutive panels on the same side of the duct.

SUMMARY OF THE INVENTION

It is an object of the invention to overcome the above disadvantages of conventional ventilation ducts.

It is a further object of the invention to provide an improved ventilation duct that does not have erosion or insulation problems, and preferably offers easy installation.

It is yet a further object of the present invention to provide an improved insulation panel that could be used to make the duct in accordance with the invention.

According to the invention, the above and other objects are achieved by a ventilation duct including a casing or envelope which is lined on the inside by at least one insulation panel. This panel has at least one lining on at least one part of at least one of its transverse edges or lines placed at the side of the circulation channel of the duct. This lining extends over at least one part of each of both sides or faces adjacent the lined edge and is integrated with the panel.

The insulation panel in accordance with the invention used for the internal lining of a ventilation duct has a lining on at least one part of at least one of its edges. This lining extends over at least one part of each of both sides adjacent the lined edge and is integrated with the panel.

By "ventilation duct," we mean a casing or duct work for air transport. This duct is part of a climate control (air-conditioning) installation, heating system or ventilation system, for example.

The casing of the duct is generally metal or construction concrete, and to the extent possible, of a "simple" section (preferably rectangular or square, possibly cylindrical). It can also be in the form of an elbow or include one or several elbow parts and can have indentations, angles, section changes, etc. This casing can also have open portions or sections that more or less place a large part of the panel or panels directly in contact with the external environment of the duct and can even be limited simply to reinforcements at the junctions of the insulation panels. In particular (for example, for ducts that are to be installed in false ceilings), the casing can simply consist of one or several T sections or profiles, bent or not, which are located at the junctions of the panels. The central portions of these T sections are placed between the panels, and their wings cover the borders or margins of the sides of the panels which are turned toward the outside of the duct.

The insulation panels of the present invention preferably are or include felts or mats of mineral wool, especially glass wool or rock wool. However, one could also use insulating foams or other similar rather rigid products having good insulation properties. The panels can have several layers (or mats) of insulating material, which are possibly separated by layers or sheets of different or similar material. These panels are provided with at least one lining that is preferably in the form of a flexible sheet or a rigid element (such as a shaped section as explained subsequently) in at least one part of at least one of their edges. This lining covers at least one part of each of the sides located on both sides of the edge (the edge being formed between two sides of the panel). The edge is intended to be a "transverse" edge in the installed position of the panel in the duct. By "transverse" we mean transverse to the direction of air circulation in the duct. The edge in question is also intended to be placed on the side (on the perimeter) of the circulation channel of the duct.

In accordance with the invention, the lining of the panel will thereby cover at least one border of the internal side of the panel and will cover or re-border the border at least of the "transverse" side (that is to say, a side having four transverse edges of which one is located on the perimeter of the circulation channel of the duct) adjacent to the lined border of the internal side. By "internal side," we mean, as previously indicated, the side facing or which is to face toward the circulation channel of the duct, that is to say on the side of air passage in the duct and generally facing the center of the duct. The lining preferably covers at least the part of the edge to be exposed to air during circulation in the duct and generally covers all of the edge.

On the other hand, the lining is integrated (or permanently installed) with the panel; it is part of the panel and is connected to the insulating material present in the panel in such a way as to obtain, notably, a structure which is coherent, manipulable, and which makes the occurrence of insulation problems (condensation, and so forth) less likely. This integration is preferably accomplished by "anchoring" (the lining, especially when it is in the form of a rigid element, will penetrate, for example, at one of its ends into the insulating material of the panel) or gluing of at least one part of the lining (especially when the lining is in the form of a flexible sheet).

Preferably the panel will have a lining as defined in accordance with the invention at each (or part of each) of its edges which are to be placed on the side of the circulation channel of the duct and extend transversely to the direction of air circulation in the duct.

The duct and the panels in accordance with the invention offer multiple advantages. In particular, they present better resistance to erosion, and the insulation within the duct is improved. The protection of the borders of the panels which are on the air passage side is particularly enhanced because of the presence of the lining defined in accordance with the invention. The prehension of the panels and the installation convenience are also improved.

As a general rule the insulation panels defined in the present invention are already covered on their internal side by a protective sheet. This sheet is capable of protecting the panels from wear and is capable, if necessary, of offering other properties: air tightness, reduction of air friction, mechanical resistance, strengthening of the acoustic or thermal insulation character, membrane effect, etc. This sheet is generally a sheet of mineral material. For example, it can be a voile or a fabric of glass, impregnated or not with an organic or inorganic binder, but can also be a sheet of aluminum, etc.

The panels can also be coated with a sheet of mineral material on their side opposite the internal side (external side). This sheet is identical to or different from the protective sheet cited previously and has properties that are the same or different. The sheets lining the panels are generally glued to the panels, for example, by using a binder which impregnates the sheets.

According to one embodiment of the present invention, the panels defined in accordance with the invention are lined on at least their internal side by such a protective sheet and are re-bordered or "edged" (that is to say the sheet which covers the internal side also covers at least one part of one adjacent side) by the sheet on at least one part of one of the sides which are to be placed transversely to the circulation direction of the duct. This side is adjacent to the internal side. In this case, the lining defined in accordance with the invention is comprised of the protective sheet that also edges at least one corner of the panel that is exposed to the passage of air. Preferably, the edged panels which are used or can be used in the duct in accordance with the invention are panels that are lined by a protective sheet on their internal side and on at least one of their sides which is to be positioned transversely to the direction of circulation of the duct as well as on the part of the external side adjacent to this transverse side. Also preferably, the insulation panels in accordance with the invention are edged by the protective sheet on their two sides which are transverse to the direction of circulation of the duct.

In this embodiment, it is possible to increase the air circulation speeds within the ducts in accordance with the invention without the risk of tearing the panels' fibers or even tearing the protective sheet covering the internal side of the panels. These panels are produced, for example, by fabricating, according to traditional and known methods, a continuous strip of mineral wool felt material that one gathers on a conveyor, then by applying to the lower side of this strip a protective sheet impregnated with a binder which glues the sheet to the felt, then by edging the lateral sides and possibly one part of the upper side of the strip by using guides or deflecting-conforming rollers. The strip is subsequently cut in the form of insulation panels, preserving at least one of the edged sides of the felt in each panel.

According to another embodiment of the invention, the panel which is used, with or without a protective sheet on its internal side (and/or on its external side) which edges the panel or not, has at least one lining in the form of a U-section in which the central part covers a part of the side of the panel which is to be installed transversely to the direction of circulation of the duct, in which one of the wings will penetrate (enter forcefully) into the insulation material of the panel and in which the other wing covers one part of the internal side of the panel.

Preferably the panel will have at least one lining in the form of a U-section profile on one part of each of the transverse sides of the panel (the panel is then provided with two shaped sections, for example). Each U-section is placed as indicated in the preceding paragraph.

The panels in accordance with the invention can be glued, nailed, or "clipped" to the interior of the duct. Preferably, however, the duct will include at least one "assembly" shaped section (for assembling panels), and the panels are installed in a simple, quick, and practical way by using said assembly shaped section(s). The assembly shaped section(s) are generally metal, or possibly made of a plastic material, and preferably will be in the shape of a Z. That is to say, they will have a central part and two wings, each wing being at a different end of the central part and the two wings being on opposite sides of the plane which passes through the central part. These shaped section(s) which are used for securing the panels are placed longitudinally in the direction of circulation of the duct. The Z-form, assembly shaped sections are particularly suitable when the ducts in accordance with the invention are in the form of quadrilaterals and are lined on the interior with one or several four-panel units.

The installation of the panels in the duct is then carried out, for example, in the following manner: a first panel is placed on the lower side of the duct, and two Z-form shaped sections are placed each on one edge of the panel in the direction of flow of the ducts; the lateral panels are then each placed on one of the shaped sections and two other Z-form shaped sections will each be put on one of the lateral panels. The last panel slides into the upper parts of the two last Z-shaped sections. The unit or consecutive units of four panels are then held by one or several consecutive units of four Z-form shaped sections.

The Z-form assembly sections can be adjusted to all types of previously mentioned ducts; in particular, it is possible to bend these sections so that they can join the curves of the ducts by cutting the two wings of the shaped sections along a generatrix in the direction of the width and by folding the central part of the shaped section along this same generatrix. One can thereby make several folds that are more or less small or large angles while following the curvature of the duct. In the same manner, the insulation panels in accordance with the invention can be slightly bent or folded along a notch (for example, a V-notch) made in the panels, so as to follow the curves or angles of the duct.

According to one highly preferred embodiment of the invention, the Z-form assembly shaped sections used in the duct in accordance with the invention have at least one wing and preferably several wings whose free end is folded down toward the "outside," i.e., toward the side of the wing that is not turned toward the central part. Contrary to the traditional Z-shaped sections, these Z-shaped sections at the folded ends do not have sharp edges that run the risk of catching the insulation panels. Rather, they have rounded, safer edges that improve the quality of installation. In addition, such Z-shaped sections at the folded edges do not present condensation problems that could possibly occur with traditional Z-shaped sections; indeed, because of the bulge formed by each folded end, the Z-shaped sections normally rest on the duct casing on substantially only two lines, preventing air from being trapped there and preventing condensation of air between elements of the duct, which are usually metal. The angle between each wing and the central part of the shaped section is selected in such a manner that it will permit the desired positioning of the insulation panels in the duct and is generally close to 90°. Preferably, particularly in the case of Z-form assembly shaped sections having at least one folded edge, the angle between each wing and the central part of the shaped section is slightly less than 90°. For example, in the case of Z-shaped sections having at least one folded edge, this acute angle is selected in such a way, as illustrated in FIG. 2, that the end of the bulge and the end of the central part of the shaped section are aligned along a line perpendicular to the central part. This design allows one to assemble two panels perpendicular to one another. The choice of an angle slightly less than 90° between the central part and each wing of the shaped section also allows one to obtain, when necessary, a slight pinching of the panels and therefore better support of these panels.

In the case of particularly long ducts that are lined on the inside with several units of consecutive panels, the junction of two consecutive panels used to cover a single side of the duct can be improved by using other assembly shaped sections, particularly when one of the panels is lined only on one of the transverse sides and is in contact with another panel on its unlined transverse side. The shaped section can be a Z-shaped section in which case the central part of the section is located between the two panels, and one of the wings of the section will cover one part of the internal side of the panel which has the unlined transverse side. This embodiment has the advantage of requiring only one type of assembly section in a duct. However, one could more simply and advantageously use a T-shaped section in which the central part is located between the two panels and the wings cover the adjacent borders of the internal sides of the two panels. This embodiment is particularly advantageous when the two panels are lined on a single transverse side and when the contact between the two panels is effected on their unlined transverse side. The T-shaped section can possibly be slightly bent along the curves of the duct.

In the case of ducts having at least one partition (a unit which includes at least two insulation panels used to divide the flow channel of the duct into several channels), the protection of the partition(s) can be improved even more by using Z-form assembly shaped sections, especially two Z-shaped sections of which their central parts are located in the same plane on the small side of the panels. The two shaped sections are each assembled along one of their wings, and the two remaining wings tighten the two insulation panels as shown subsequently. The use of these shaped sections in this case will also avoid passage of air between the two panels which are part of the partitions. One can also use other protective elements (such as an element based on insulation material in the form of a full half-cylinder that one protects by means of shaped sections, for example by using Z-shaped sections) and/or other sections (U section), this embodiment having only the disadvantage of requiring other types of elements or shaped sections.

BRIEF DESCRIPTION OF THE DRAWINGS

Other advantages and characteristics of the invention will be apparent in light of the following drawings that illustrate the invention, without in any case limiting it, in which.

DETAILED DESCRIPTION OF THE PREFERRED EMBODIMENTS

Figure 1A:
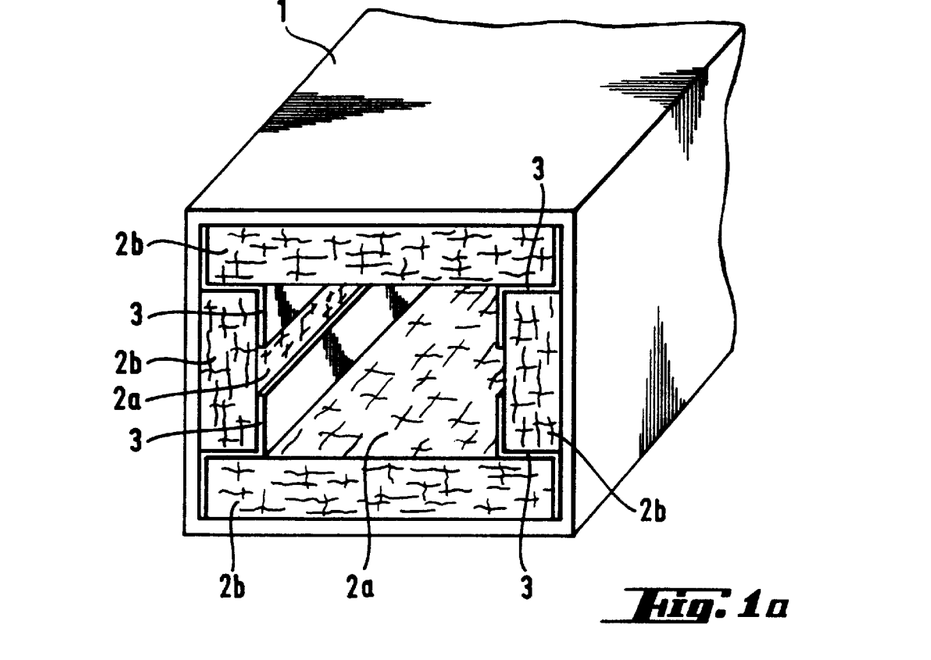
FIG. 1a and 1b are schematic perspective views of one end of the duct in accordance with the invention. This duct is provided with an internal lining which includes insulation panels and Z-form assembly sections, the two figures illustrating two different possible arrangements of the sections and the insulation panels inside the duct.
Figure 1B:
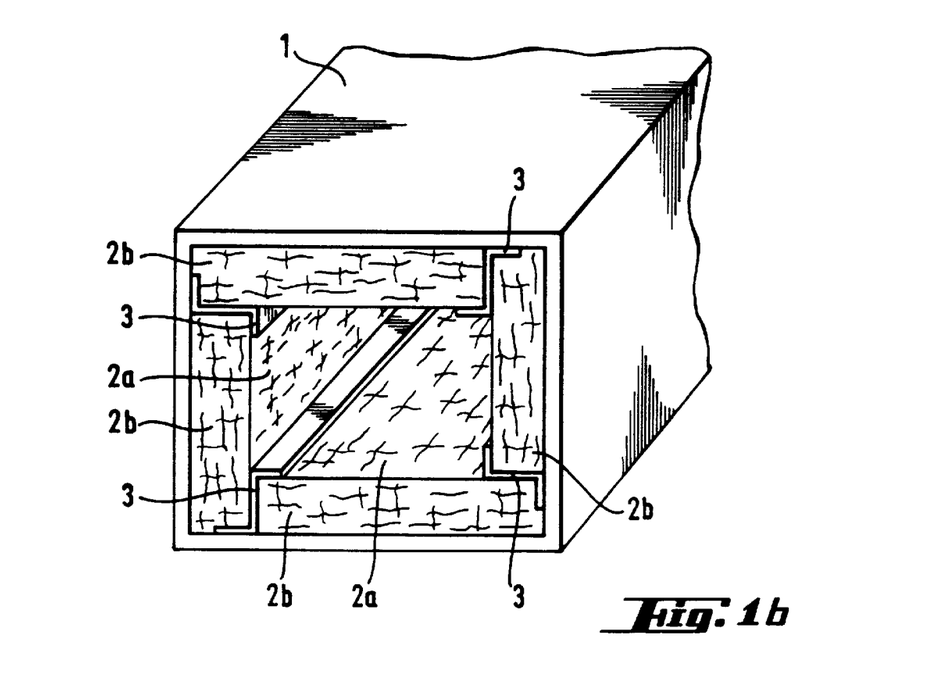

The duct shown in FIG. 1a or FIG. 1b includes a metal casing 1 and one or more units of four insulation panels of glass wool. The internal sides of the panels 2a are lined with a protective sheet which is a voile of glass and edged by the lining sheet which also covers their transverse (visible) sides 2b. Four Z-form assembly metal sections 3 hold the insulation panels in the duct. The wings (small flanges) of the shaped sections 3 can have the same length as the small side of the insulation panels (FIG. 1a) or can be of a slightly smaller dimension (FIG. 1b).

Figure 2A:
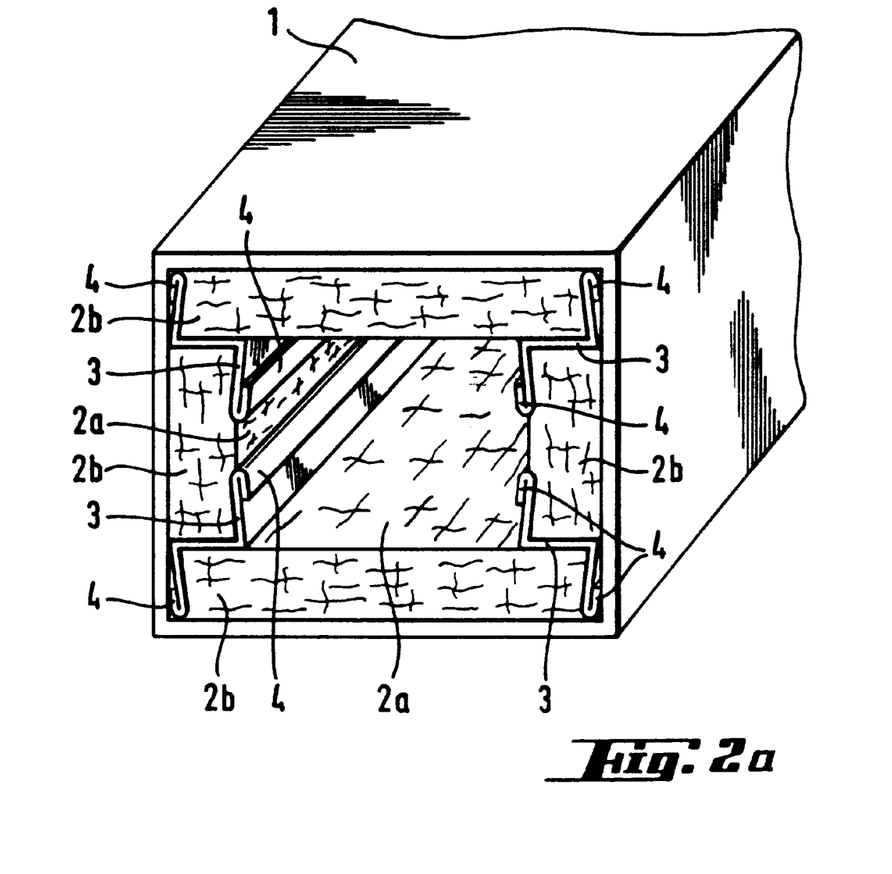
FIG. 2a is a schematic perspective view of one end of a preferred duct in accordance with the invention provided with an internal lining that includes insulation panels and Z-form assembly sections which have folded edges.
Figure 2B:
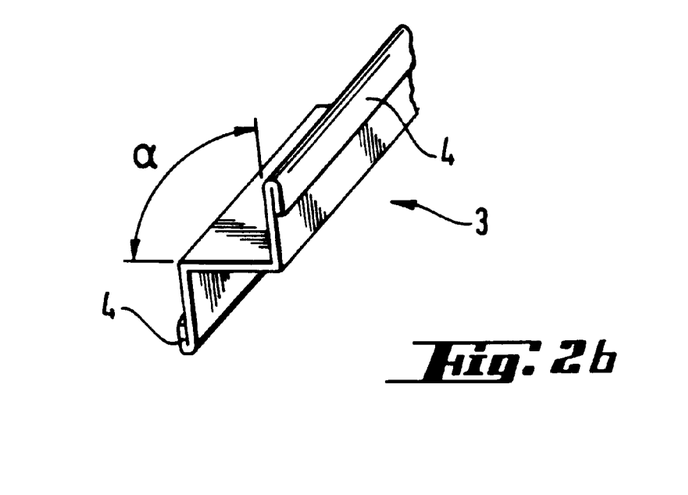
FIG. 2b is a schematic view of the type of section used in this duct.

The duct shown in FIG. 2a corresponds to the duct shown in FIG. 1a, except that the "traditional" Z-form assembly sections have been replaced by special Z sections in which the wings are folded at their free ends in such a way as to form a bulge 4. These special sections are thus resting on the casing of the duct at substantially only two lines (at the end of the bulge and at one end of the central part of the shaped section) and allow one to avoid problems of condensation between the metal wall and the shaped sections. Each section also has an angle a between each wing and the central part which is slightly less than 90° in order to permit positioning of the central part of the section parallel to one side of the duct and positioning of the panels perpendicular to one another while effecting a slight pinching action of the panels.

Figure 3A:
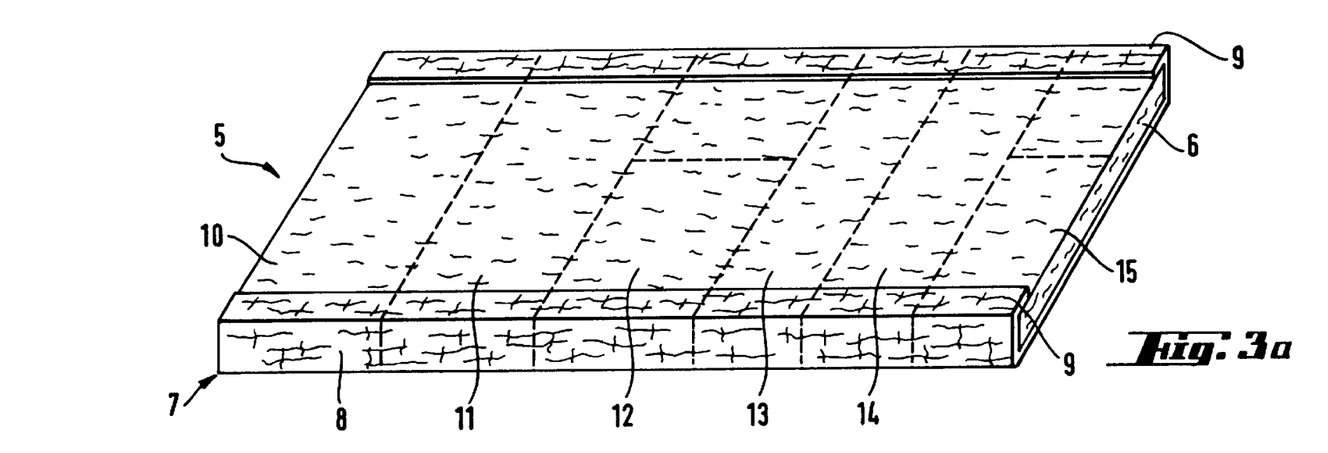
FIG. 3a is a schematic perspective view of a continuous strip of felt of mineral wool lined on one side and edged by a protective sheet, from which one cuts off insulation panels.

FIG. 3a shows a strip 5 of mineral felt material 6 covered with a glued protective sheet 7 and edged, the mineral felt strip being produced according to known methods and the edging being carried out by using deflecting-conforming wheels following application of a protective sheet to the lower side of the strip. The protective sheet 7 is wider than the strip in question and covers the lateral sides 8 in relation to the direction of moving of the strip and parts 9 of the upper side which are adjacent to these lateral sides 8. Panels 10, 11, 12, 13, 14, and 15 are then cut along the dashed lines of FIG. 3a and used to internally cover the casing of a duct of rectangular section in order to obtain a duct in accordance with the invention.

Figure 3B:
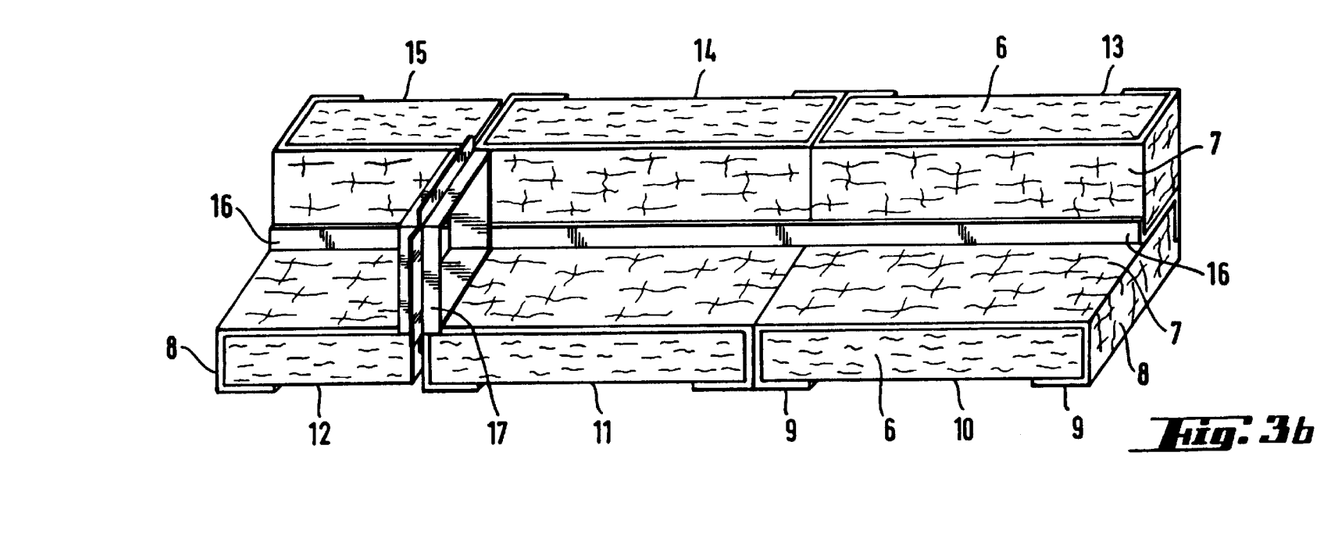
FIG. 3b shows one part of the internal lining of a duct in accordance with the invention, which is made from the cut insulation panels.

This duct is produced (FIG. 3b) by placing the required number of panels (10, 11, 12) in order to cover the lower side of the duct on the casing (not shown here) of the duct, the edged side(s) of the panels extending transversely to passage of the air, and the main sides of the panels covered with the protective sheet facing toward the inside of the duct. The Z-form assembly shaped sections 16 (possibly having folded ends) are placed on the longitudinal edges of these panels (the shaped sections are not shown at the front of the figure), and lateral insulation panels (13, 14, 15) are placed on the shaped sections 16 (the front panels are not shown), after which additional sections 16 are positioned and the upper panels (not shown) put in place. Some panels (12, 15) are of shorter length than the standard width of the felt strip being used in this embodiment. These panels consequently have only one edged side. They are protected on their side that is not edged by a T-section assembly part 17 (shown entirely) which is inserted between these panels and the consecutive panels.

Figure 4:
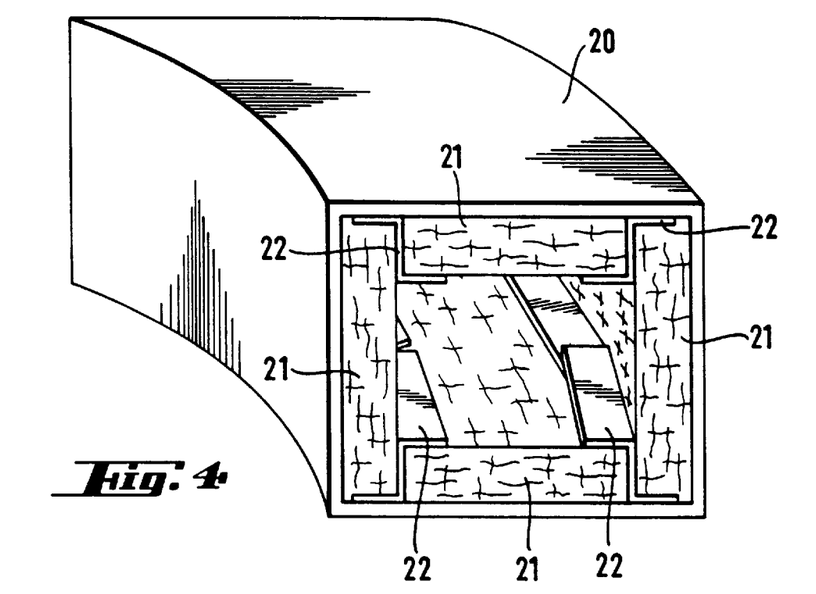
FIG. 4 is a schematic perspective view of an elbow duct in accordance with the invention.
Figure 5A:
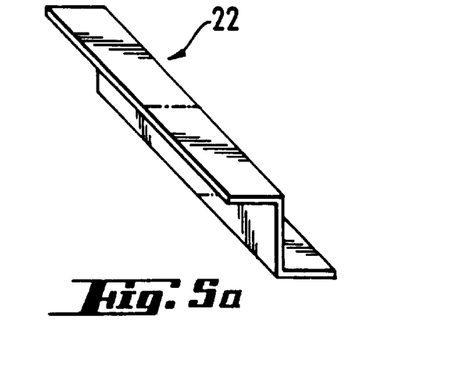
FIGS. 5a and 5b, 6a and 6b show the assembly sections used in this duct before and after cutting of their wings and bending.
Figure 5B:
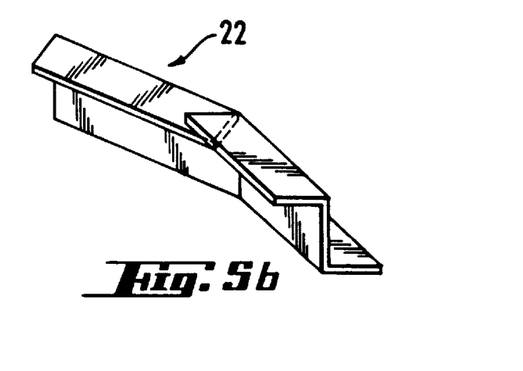
Figure 6A:
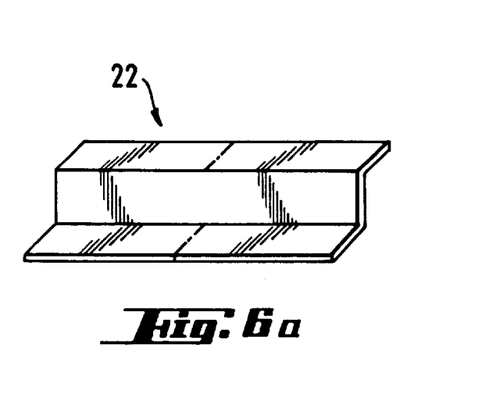
Figure 6B:
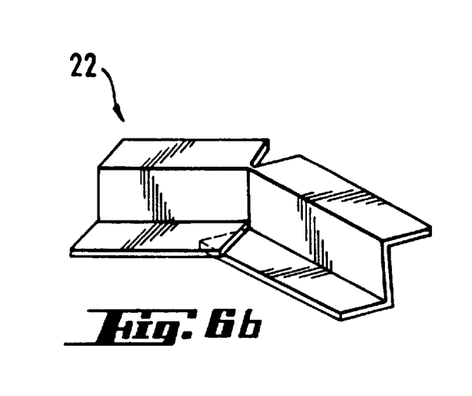

FIG. 4 shows a duct in accordance with the invention that has a curve. This duct includes a casing 20, insulation panels 21 covered with a protective sheet on their internal side and on edges, and Z-form assembly sections 22 that can possibly have folded ends. The assembly sections used here are bent at one or several places in order to follow the curvature of the duct. In order to bend these shaped sections, it is sufficient to cut the two wings of the shaped sections along a selected generatrix (dot and dash line of FIG. 5a and FIG. 6a), and to bend the central part of the section along this generatrix (FIGS. 5a and 5b, 6a and 6b). The insulation panels are also cut or bent in order to follow the curves of the duct.

Figure 7A:
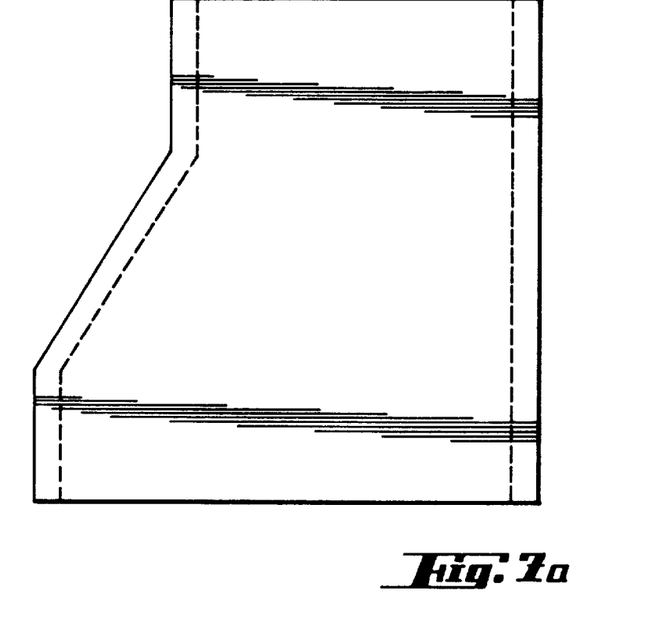
FIG. 7a is a schematic top view of a duct in accordance with the invention, one part of the internal lining of this duct being shown in a perspective view FIG. 7b.
Figure 7B:
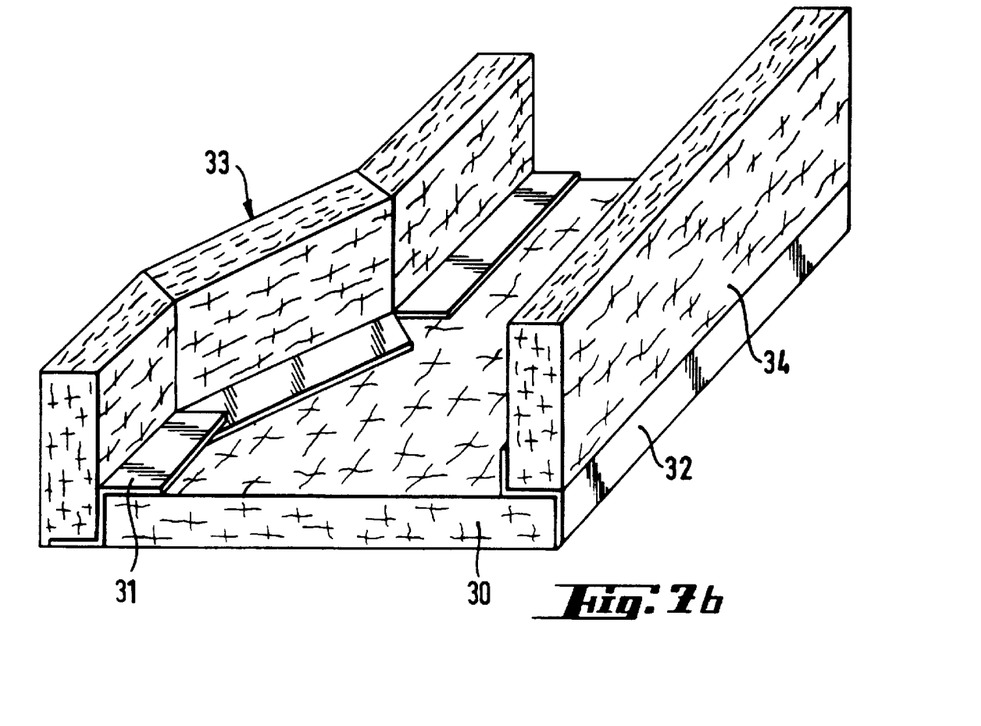

FIG. 7a schematically shows a top view of the contour of a duct in accordance with the invention that has section changes. The internal lining of this duct is produced (FIG. 7b) by inserting, through the largest side of the duct, the lower insulation panel 30 that is lined by a protective sheet on its internal side and on edges (the envelope of the duct is not here shown). The Z-form assembly sections (31, 32) are then placed on the longitudinal edges of this panel, one of the sections 31 being folded at several places (after cutting of the flanges of the section along generatrices according to the principle illustrated in FIGS. 5a, 5b, 6a and 6b). These sections possibly have folded ends. The lateral insulation panels (33, 34) are then placed on the shaped sections 31 before inserting additional assembly sections and sliding the upper panel (not shown here) on these sections. The lateral panel 33 can be of a single piece and have folds along V notches in the panel which are made in advance, or there can be three panels whose small sides are cut in such a manner as to come into contact with one another. These sides are possibly joined by means of assembly sections approximately in the form of a T, whose angle between the central part and each of the flanges is adjusted to the angle between the assembled panels.

Figure 8:
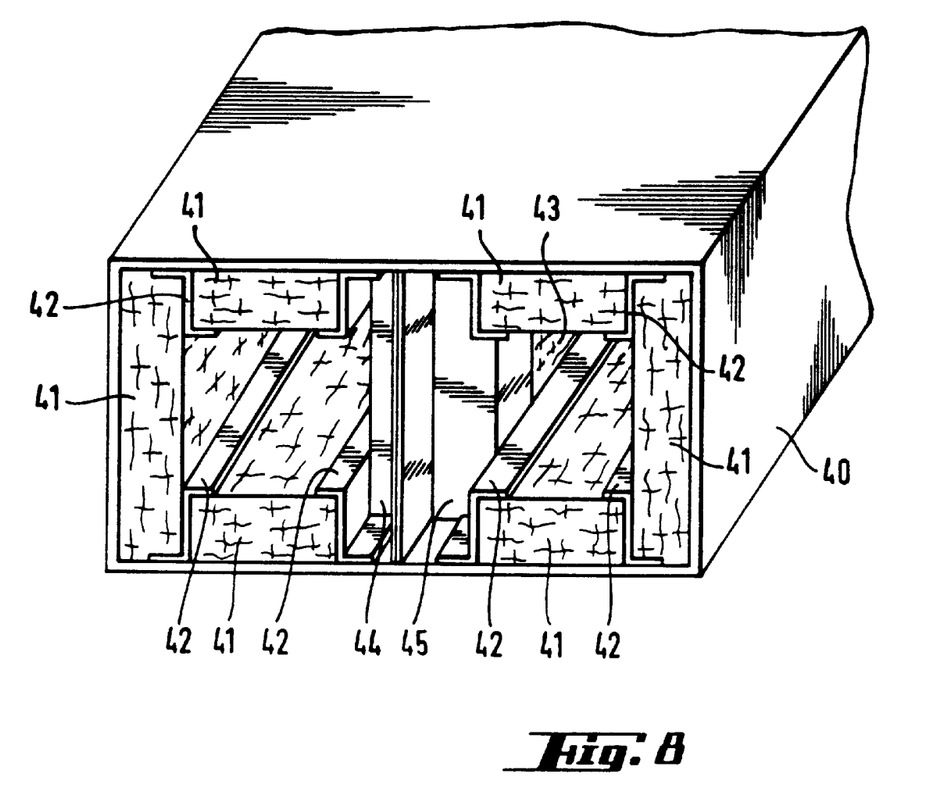
FIG. 8 is a schematic perspective view of one end of a duct in accordance with the invention which has a partition.

The duct shown in FIG. 8 includes a metal casing 40, insulation panels 41 lined on their internal side and at edges by a protective sheet, Z-form assembly sections 42 for installation of the panels, and a partition 43 comprised of two insulation panels that are glued to one another. The resulting partition is lined with a protective sheet on its two main sides. At least one of the transverse sides to the direction of flow of the duct of this partition is inserted in an assembly of two oppositely oriented Z sections (44, 45) which are secured to one another at one of their flanges, by welding or gluing for example.

Figure 9:
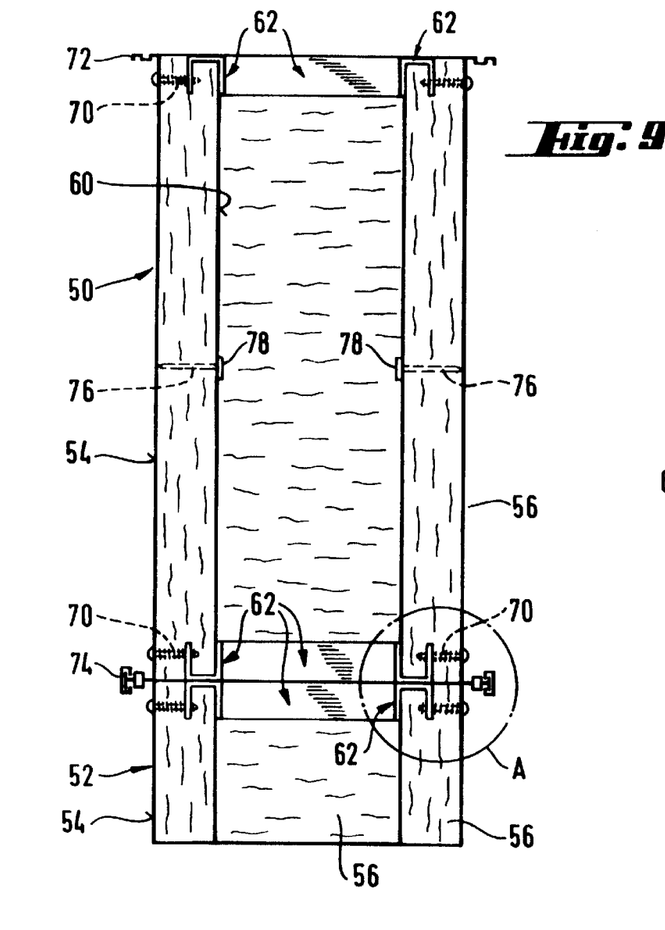
FIG. 9 is a top view (the upper part of the envelope and the upper panels being removed) of an assembly of ducts in accordance with the invention.
Figure 10:
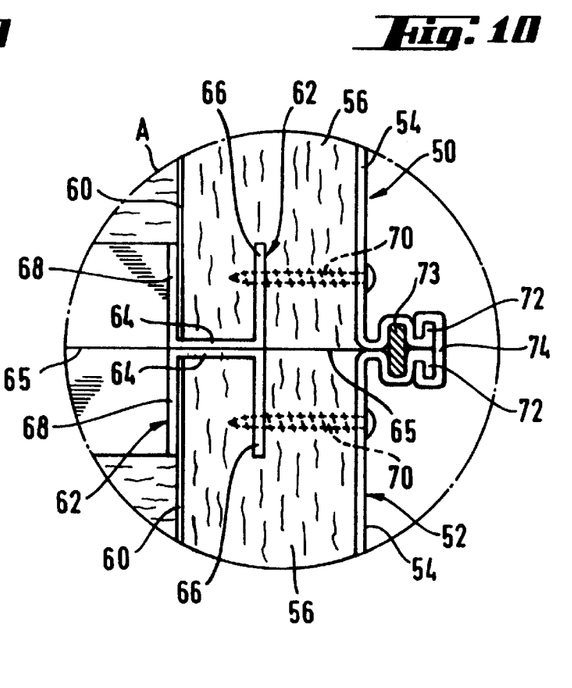
FIG. 10 is an enlargement of part A of FIG. 9.

The assembly unit shown in FIGS. 9 and 10 includes two ducts with rectangular sections 50, 52 (shown partially) assembled end to end. Each duct includes a casing 54 of a thickness of 1 mm, for example. This duct is lined internally with insulation panels 56 based on glass or rock wool with a thickness between 20 and 100 mm, for example. The internal side of the panels is possibly covered with a fireproof layer 60, in the form, for example, of a glass fabric. This layer also allows cleaning of the inside of the duct. Each panel 56 includes two shaped sections 62 having a thickness of 0.7 mm for example, the central part 64 of each section being in direct contact with only one part of a transverse side 65 of the panel, one of the flanges 66 penetrating into the insulation material, and the other flange 68 covering one part of the internal side of the panel (FIG. 10). In this embodiment, the creation of thermal bridges between the outside and inside of the duct is avoided because of the absence of metal material between the flange 66 of the section which is inserted in the panel and the casing of the duct.

The panels can, for example, be secured by screws (for example, self-boring screws) 70 which go through the envelope of the duct, one part of the insulating material and the flange of the shaped sections which is forced into the insulation material (the thermal bridges at the level of these very limited elements being relatively small). The panels can also be secured by means of other screws or devices (such as pins 76 and washers 78 shown in FIG. 9) placed in the middle of the panel, for example.

The two ducts can be connected to one another as shown more clearly in FIG. 10. The casing of each duct is folded at each of its ends in such a way as to form the flanges 72 which allow its assembly with another duct. The flanges of two adjacent ducts are of symmetrical shape with respect to the plane which is perpendicular to the axis of the ducts, and in the space defined by these flanges an airtight fitting or packing 73 is inserted; a guide or locking bar 74 holds the joined flanges. Such flanges can be provided on the end of each side of the duct.

Figure 11:
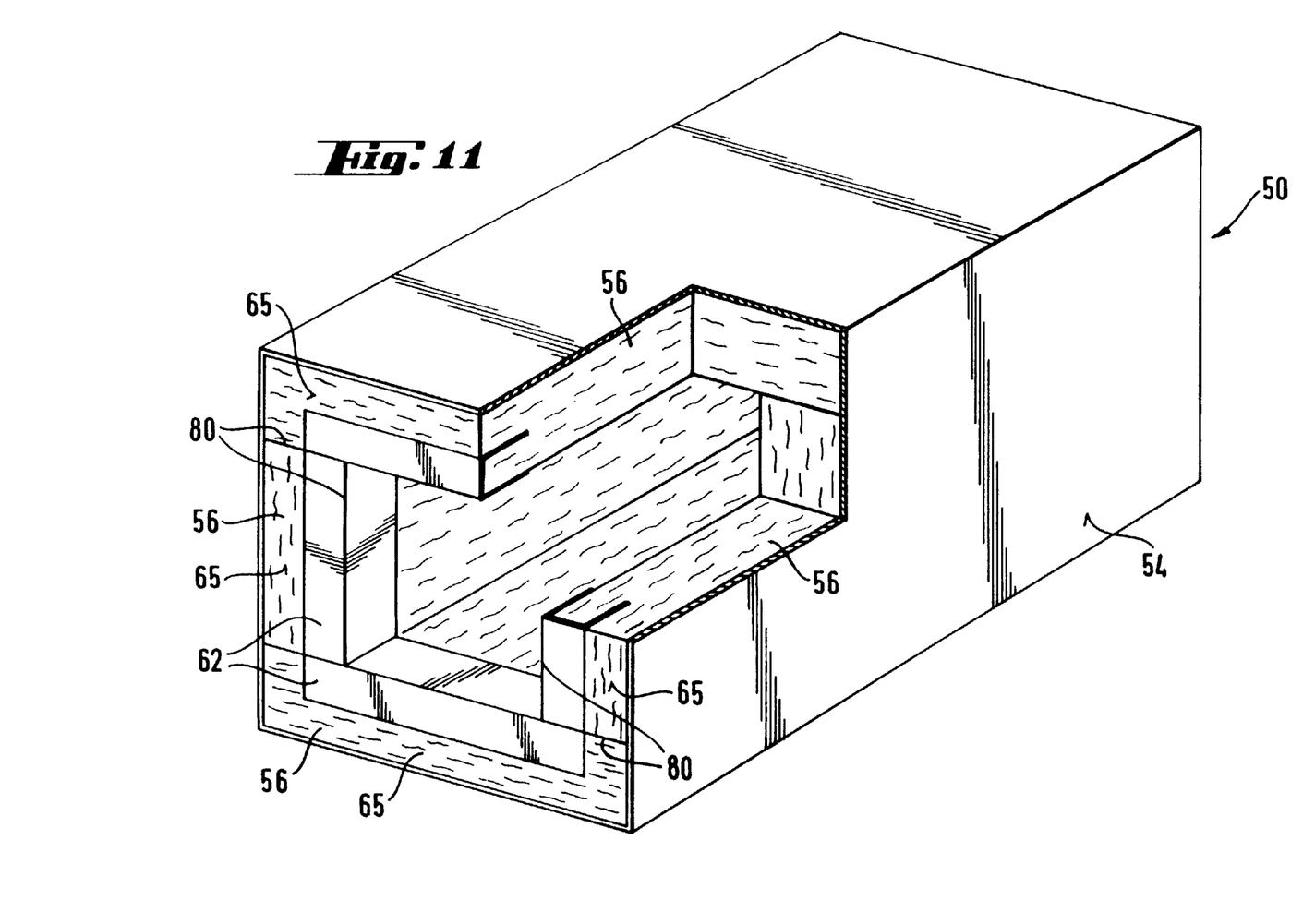
FIG. 11 is a schematic perspective view of one end of a duct similar to that of FIG. 9.

The duct shown in FIG. 11 is similar to the duct shown in FIG. 9 (the common elements being designated by the same reference numbers and this duct not being provided with screws or edges for assembly, the assembly of the panels being accomplished by gluing or by shaped sections not shown here, for example). In this embodiment, the lining (the shaped sections) of the panels of the duct in accordance with the invention covers, on some panels, only one part of the transverse edges 80 which are turned toward the flow channel of the duct. This part is essentially the part of the edges directly exposed to air during circulation in the duct.

The duct according to the invention can be used in any ventilation installation, and the insulation panels in accordance with the invention can be used in any type of ventilation duct. Obviously, numerous modifications and variations of the present invention are possible in light of the above teachings. It is therefore to be understood that the invention may be practiced otherwise than as specifically described herein.

What is claimed as new and is desired to be secured by Letters Patent of the United States is:

1. A ventilation duct comprising:
   an envelope;
   at least one insulation panel lining an interior of said envelope, thereby forming a circulation chamber in which a gas can flow in a flow direction;
   at least one lining integrated with the at least one insulation panel and positioned on at least one part of at least one edge of the at least one insulation panel, this edge extending in a direction transverse to the flow direction and being placed at the side of the circulation chamber, and positioned on at least a part of each of both sides of the at least one insulation panel adjacent the at least one edge; and at least one substantially Z shaped section.

2. The duct according to claim 1 wherein said at least one lining comprises a protective sheet lining a side of said at least one insulation panel that faces the circulation chamber and at least one part of the at least one edge.

3. The duct according to claim 1 wherein said at least one lining comprises a U section having:

- a central part covering one part of one transverse side of the panel;
- a wing flange penetrating into the at least one insulation panel; and
- another wing flange which covers a part of a side of said at least one insulation panel that faces the circulation chamber.

4. The duct according to claim 1 wherein said at least one Z shaped section has at least one flange having a free end which is folded.

5. The duct according to claim 1 wherein the duct has a rectangular or square section and comprises at least one assembly of four insulation panels held by said Z shaped sections.

6. The duct according to claim 1 including at least two consecutive insulation panels in the flow direction on a single side of the envelope, further comprising at least one T shaped section at a junction of said consecutive panels.

7. The duct according to claim 1 wherein said at least one insulation panel comprises mineral wool.

8. An insulation panel used for internal lining of a ventilation duct, comprising:

- a panel body formed of an insulating material;
- at least one lining integrated with the panel body and positioned on at least one part of at least one edge of said panel body and on at least a part of each of both sides of the panel body adjacent the at least one edge; and
- at least one substantially Z shaped section.

* * * * *